Figure 2:
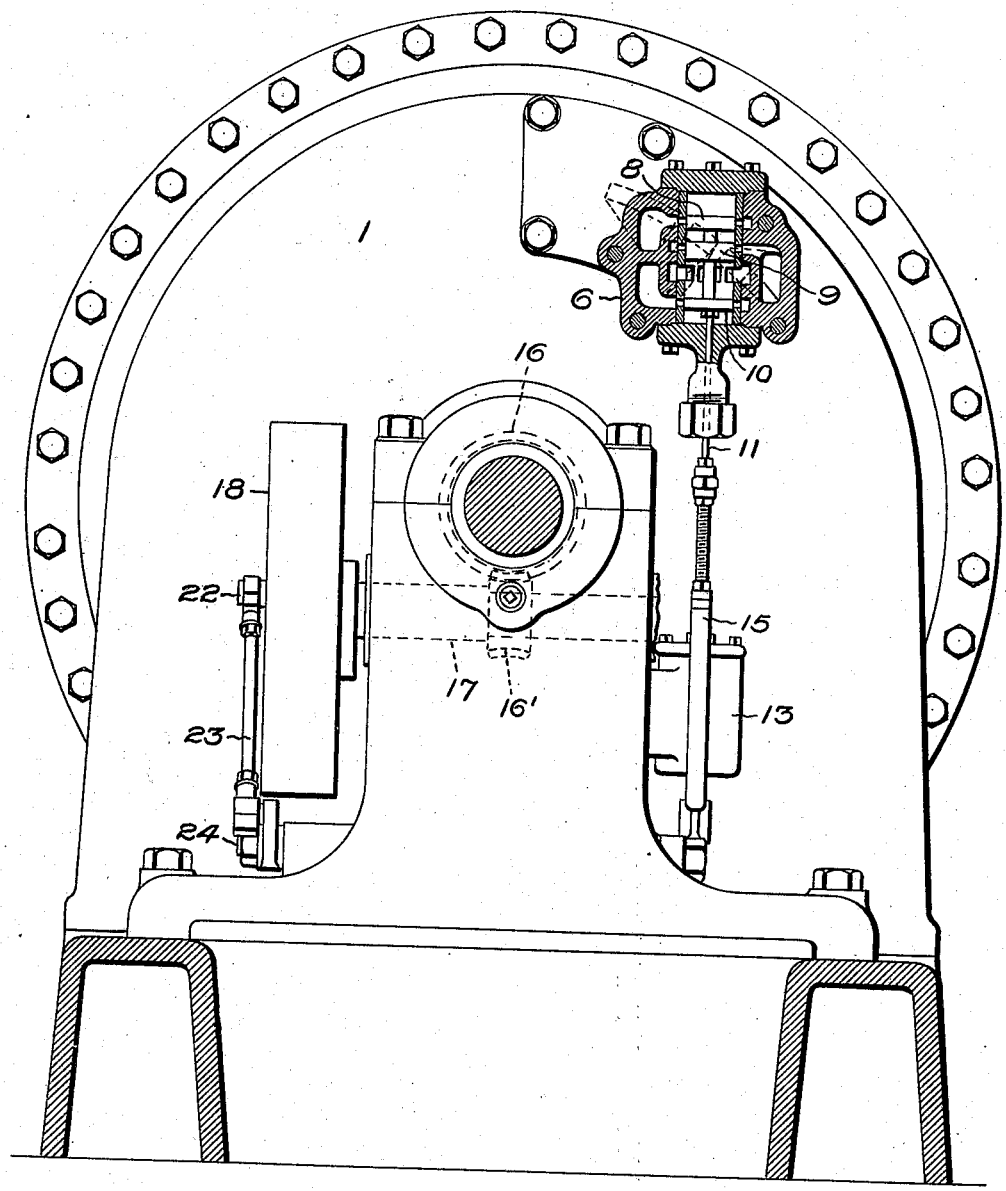

No. 848,093. PATENTED MAR. 26, 1907.
W. L. R. EMMET.
GOVERNING MECHANISM FOR TURBINES.
APPLICATION FILED JULY 25, 1906.

2 SHEETS—SHEET 1.

Fig. 1.

Witnesses:
Marcus L. Byng.
Helen Orford

Inventor:
William L. R. Emmet,
by Albert G. Davis
Atty.

No. 848,093. PATENTED MAR. 26, 1907.
W. L. R. EMMET.
GOVERNING MECHANISM FOR TURBINES.
APPLICATION FILED JULY 25, 1906.

2 SHEETS—SHEET 2.

Witnesses:
Marcus L. Byng.
Helen Orford

Inventor:
William L. R. Emmet,
by Albert G. Davis
Atty.

UNITED STATES PATENT OFFICE.

WILLIAM L. R. EMMET, OF SCHENECTADY, NEW YORK, ASSIGNOR TO GENERAL ELECTRIC COMPANY, A CORPORATION OF NEW YORK.

GOVERNING MECHANISM FOR TURBINES.

No. 848,093.  Specification of Letters Patent.  Patented March 26, 1907.

Application filed July 25, 1906. Serial No. 327,599.

*To all whom it may concern:*

Be it known that I, WILLIAM L. R. EMMET, a citizen of the United States, residing at Schenectady, in the county of Schenectady and State of New York, have invented certain new and useful Improvements in Governing Mechanism for Turbines, of which the following is a specification.

The present invention relates to governing mechanism for turbines, and has for its object to provide a mechanism of improved construction which is simple and rugged in character, reliable, and capable of close regulation in operation.

In carrying out my invention one or more suitable valves are provided which control one, two, three, or more ports, passages, nozzles, or other fluid-discharging devices. The latter may admit motive fluid to the wheel-buckets of the first stage, to those of a subsequent stage, or to both the admission and stage fluid-discharging devices. The valve or valves is or are provided with a suitable stem or actuator, and under normal operating conditions the actuator and valve or valves is or are constantly moving to and fro by a slight amount to overcome static friction, the movement being controlled, primarily, by a suitable speed or load responsive device or governor and, secondarily, by a dash-pot or equivalent device. I arrange the valve and speed-responsive device in such manner that the valve is for a given load positively moved in a direction to open it a predetermined number of times per minute, and the degree of said opening is determined by the load on the turbine. The secondary governor controls the amount that the valve or valves will close after each of said opening movements. To carry out this feature of the invention, I have chosen as an illustration a dash-pot which works freely or comparatively so in opening the valve and which causes the valve to slowly close wholly or in part after each opening. A suitable weight, spring, or equivalent means is employed to close the valve when the effect of the opening device or governor is removed. By properly adjusting the relation of the dash-pot, spring, and governor the valve or valves will open to a predetermined point for a given load condition a definite number of times per unit of time and slowly close by a greater or less amount between strokes of the governor-controlled actuator. To state the matter in other words, the valve or valves are positively opened, and as soon as the governor-controlled actuator reverses its movement it or they start to close and continue to do so until the governor-controlled actuator reverses and starts its valve-opening movement. By reason of these arrangements the valve or valves will be "floating," so to speak, between two positions, which define the limits of the region of movement of the valve or valves for any given load, and said region will vary as the load changes.

In the accompanying drawings, which illustrate one of the embodiments of my invention, Figure 1 is a view in side elevation of my improved governing mechanism applied to a turbine, certain of the parts being broken away for the purpose of illustration; and Fig. 2 is an end view of the same.

1 represents a turbine of suitable construction. It may with advantage be of the Curtis type; but the invention is applicable to other types of turbines as well. In the particular turbine which I have chosen for illustrative purposes 2 represents the main shaft, upon which is mounted a wheel having one or more rows of peripheral buckets 3. Between the rows of wheel-buckets are intermediate buckets 4, that receive the steam or other motive fluid from one row of wheel-buckets and after changing the direction discharge the same against the adjacent buckets on the exhaust side. Fluid is admitted to the first row of buckets by a nozzle 5 or other fluid-discharging device. The nozzle is attached to a steam-chest 6 and the latter is bolted to the casing of the machine. A single stage has been shown; but it is to be understood that the invention is applicable to turbines having one or a number of stages. Instead of controlling the admission of motive fluid the mechanism may control the passage of fluid from one stage to another or both admission and stage control.

Fluid is admitted to the turbine by the supply-conduit 7, which may be connected to a boiler or to a low-pressure supply—such, for example, as the exhaust of another turine, a reciprocating engine, a receiver, or low-pressure generator. In the steam-chest is a piston-valve having one, two, or more heads or valves, depending upon the number of ports and fluid-discharging passages to be controlled. In the present illustration three heads 8, 9, and 10 are provided. The valve is mounted on a stem 11, and the latter extends through a suitable packing. To the lower end of the stem is secured a piston 12, located within a dash-pot cylinder 13, the latter being secured to a suitable support—such, for example, as the bearing-standard of the main shaft. Between the piston and a suitable abutment is a compression-spring 14, tending at all times to force the piston downward and close the valve. Also mounted on the valve-stem is a yoke 15, by means of which the valve is positively opened by an amount depending upon the load conditions.

The speed-responsive mechanism for actuating the valve will now be described. Mounted on the main shaft is a worm 16, Fig. 2, meshing with a worm-wheel 16', mounted on the low-speed shaft 17. On one end of the shaft is mounted a fly-wheel 18 or other rotating element, and mounted thereon is a pivoted weight 19 (shown in dotted lines, Fig. 1) and arranged to move on its pivot in the plane of the fly-wheel.

20 represents the pivot for the weight, and 21 an extension-spring for opposing its movement. Mounted on the lever connecting the weights is a wrist-pin 22, the orbit of which enlarges and diminishes as the load, and consequently the speed, of the turbine changes. As shown, the orbit of the wrist-pin would have the maximum diameter. As the load decreases and the speed increases the axis of the wrist-pin moves nearer and nearer to the axis of the low-speed shaft until it finally coincides therewith, at which time the connecting-rod 23 has no movement. Under normal working conditions the said rod has a reciprocating movement, and once for each cycle it moves the valve or valves to their upper limit for the load then on the turbine. Situated in the base of the pillow block or standard and extending parallel with the low-speed shaft is a rock-shaft 24, the extent of movement of which varies with the load. On the end of the shaft away from the connecting-rod is a lever 25, which under normal operating conditions makes a certain number of vibrations per minute, the amplitude of said vibrations being directly dependent upon the load on the turbine. The free end of the lever is arranged to strike the lower end of the yoke 15 each time it moves upward. By reason of the dash-pot the valve does not fully close each time the lever moves downward, but moves only a certain distance. The amount that it moves down can be regulated to suit the load conditions by adjusting the effect of the spring and the dash-pot. On the upward stroke the lever raises the yoke and the valve from the lower position to a given upper position determined by the throw of the lever.

It is evident that when the orbit of the wrist-pin 22 is at a maximum it will give the maximum vibration of the governor-controlled lever or actuator 25, and hence all the valves will open their ports for each stroke. As the size of the orbit of the wrist-pin decreases the throw of the lever 25 will decrease, and therefore the upward movement of the valve-stem. Under certain conditions only one piston-valve head will be opening and closing its port or ports wholly or in part; under great loads two piston-valve heads, and so on. The parts are preferably so arranged that their weight assists in closing the valves; but the arrangement can be changed, if desired, to meet the requirements.

Steam or other motive fluid enters through the conduit 7 and fills the space between the piston-valve heads 9 and 10 and also the spaces above and below the heads 8 and 10, respectively. Opposite each head is one or more ports leading to one or more passages in the nozzle 5. The piston heads and ports are so related that the head 10 first exposes a port, then the upper head 8, and finally the head 9. This gives successive opening and closing of the ports.

The governor and the parts actuated thereby are so related to the valve that the free end of the lever 25 will strike the under side of the yoke 15 near the end of its travel and when the wrist-pin 22 is passing the lower dead-center. By reason of this arrangement the movement of the lever at the time it raises the valve or valves will be relatively slow and the effect of the blow will be at a minimum. If desired, I may interpose a resilient medium between the end of the lever and coöperating projection on the end of the yoke.

In accordance with the provisions of the patent statutes I have described the principle of operation of my invention, together with the apparatus which I now consider to be the best embodiment thereof; but I desire to have it understood that the apparatus shown is only illustrative and that the invention can be carried out by other means.

What I claim as new, and desire to secure by Letters Patent of the United States, is—

1. In a governing mechanism for turbines, the combination of a valve whose region of movement varies for different loads, a speed-responsive device for changing the region of movement of the valve, and a means that acts to retard the movements of the valve in the opposite direction.

2. In a governing mechanism for turbines, the combination of a regulating-valve, a governor which imparts a certain number of strokes to the valve in a given unit of time, and a means which retards the movement of the valve in the opposite direction.

3. In a governing mechanism for turbines, the combination of a regulating-valve, a governor which positively imparts to the valve in one direction a given number of strokes per interval of time, and a device which moves the valve in the opposite direction and also retards it.

4. In a governing mechanism for turbines, the combination of a regulating-valve, a governor, a valve-actuator reciprocated directly by the governor in one direction at a speed and through a distance determined by the speed of the turbine, a retracting device for said actuator acting in opposition to said actuator, and means for retarding the effect of said retracting device.

5. In a governing mechanism for turbines, the combination of a regulating-valve, a governor responsive to speed changes, a lever actuated by said governor at a speed and through an angular distance depending upon the speed of the turbine, a valve-actuator operated by said lever to open said valve, a spring for closing said valve, and a retarding device controlling the rate of closing.

6. In a governing mechanism for turbines, the combination of a regulating-valve, a governor comprising a weight pivoted eccentrically to its axis of revolution, a lever connected to said weight, a valve-stem operated by said lever in one direction, a spring to move said valve in the opposite direction, and a dash-pot to control the rate of movement by said spring.

7. In a governing mechanism for turbines, the combination with a regulating-valve controlling two or more ports in succession during its travel, of a valve-stem, a governor responsive to speed changes, and intermediate mechanism whereby said governor will actuate said stem by an amount inverse to the speed of the turbine.

8. In a governing mechanism for turbines, the combination with a regulating-valve controlling two or more ports in succession during its travel, of a valve-stem, a governor comprising a revolving weight pivoted eccentrically to the axis of revolution, a wrist-pin on said weight, whose orbit of revolution varies in diameter inversely with the speed of the turbine, a lever connected to said pin and actuating said stem in one direction, and a retarded device for moving said stem in the opposite direction.

In witness whereof I have hereunto set my hand this 20th day of July, 1906.

WILLIAM L. R. EMMET.

Witnesses:
BENJAMIN B. HULL,
HELEN ORFORD.